UNITED STATES PATENT OFFICE.

JOHN STUCKES, OF ST. LOUIS, MISSOURI.

PROCESS OF MAKING STICK-CANDY.

No. 12,563. Specification of Reissued Letters Patent. Reissued Nov. 20, 1906.

Original No. 800,600, dated September 26, 1905. Application for reissue filed April 20, 1906. Serial No. 312,930.

*To all whom it may concern:*

Be it known that I, JOHN STUCKES, a citizen of the United States, residing at the city of St. Louis, State of Missouri, have invented a certain new and useful Improvement in Processes of Making Stick-Candy, of which the following is a full, clear, and exact description, such as will enable others skilled in the art to which it appertains to make and use the same.

This invention relates to the manufacture of candy known as "hard-boiled" goods, which is usually marketed in the form of stick-candy.

The object of the invention is to cheapen the cost of manufacture and improve the quality so that the candy will not deteriorate with age, and in this manner the manufacturer is enabled to make up a stock of candy for future delivery. Heretofore in the production of hard-boiled candy difficulty has been experienced in using a large percentage of corn-sugar, (glucose,) due to the fact that such candy quickly responds to atmospheric changes and will "run" or become "sticky" when the air is humid.

In the use of the present invention the following are the proportions of the ingredients preferably used: cane-sugar, forty-eight pounds; water, sufficient to dissolve sugar; corn-sugar, (glucose,) fifty-two pounds. The above ingredients are properly mixed in a kettle and the mass transferred to a vacuum-pan, where it is cooked for a sufficient length of time. The product is then apportioned into workable masses and placed upon a slab or slabs. To the quantity of material above specified I add one and one-fourth pounds of common fat, preferably stearin previously prepared by rubbing into the fat a small quantity of powdered cane-sugar for the purpose of blending it and enabling it to be more easily mixed with and absorbed by the mass. The distribution of this fat through the mass may be assisted by dividing the sugar and fat into small blocks and working the same into different parts of the mass.

Instead of adding the fat to the mass on the slab the fat may be introduced into the mixing-kettle and placed with the mass into the vacuum-pan. The above-described mass is used to form the body portion of the candy.

The outer or shell portion of the candy is preferably made separately and may consist of one hundred pounds of cane-sugar and thirty-five pounds of corn-sugar (glucose) with sufficient water to dissolve the sugar. This is cooked sufficiently and placed upon a slab in readiness to be made use of as the outer shell or casing for the fat-mixed body portion above described. To the mass of candy to be used as the shell portion I add one and one-fourth pounds of common fat, preferably stearin previously prepared by rubbing into the fat a small quantity of powdered cane-sugar for the purpose of blending it and enabling it to be more easily mixed with and absorbed by the mass. The distribution of this fat through the mass may be assisted by dividing the sugar and fat into small blocks and working the same into different parts of the mass. Instead of adding the fat to the mass on the slab the fat may be introduced into the mixing-kettle and placed with the mass into the vacuum-pan.

I do not confine myself to the use of any particular fat in making either the body or shell portions of the candy, as any wholesome fat, preferably one having a melting-point not lower than 50° Fahrenheit, will be suitable for the purpose. I prefer, however, the stearin on account of its cheapness; but vegetable fat, such as cocoa-butter, may be used.

By making the mass composing the outer shell with a small percentage of glucose the candy will withstand considerable amounts of dampness without becoming sticky. The fat appears to protect the candy from the action of the atmosphere, as it remains clear and dry for a long period of time and does not become stale or change color.

In using fat with the mixture in accordance with my invention I can employ as high as eighty per cent. of glucose to twenty per cent. of cane-sugar and the candy will not get sticky or run. I therefore do not confine myself to any percentage of glucose or cane-sugar, as the same may be varied within the skill of the candy-maker without departing from the scope of my invention.

The usual coloring and flavoring materials may be used in the candy.

Having thus described the invention, what is claimed as new, and desired to be secured by Letters Patent, is—

The herein-described process of making stick-candy and similar hard-boiled goods, consisting in making two separate masses by boiling sugar and corn-sugar (glucose) in water, making one of said masses with a greater percentage of glucose than is contained in the other mass; mixing a common fat with both of said masses; making from the said mass which contains the larger percentage of glucose the body or interior of the pieces of candy, and forming from the remaining mass the outer shell of said pieces of candy; substantially as described.

In testimony whereof I hereunto affix my signature, in the presence of two witnesses, this 17th day of April, 1906.

JOHN STUCKES.

Witnesses:

F. R. CORNWALL,

GEORGE BAKEWELL.